A. J. GREENE.
Hay Rake.

No. 70,550. Patented Nov. 5, 1867.

Witnesses:
Theo Tusche.
J. A. Service.

Inventor:
A. J. Greene.
Per Munn & Co
Attorneys.

United States Patent Office.

ALBERT J. GREENE, OF STERLING, MASSACHUSETTS.

Letters Patent No. 70,550, dated November 5, 1867.

IMPROVEMENT IN HAY-RAKES.

*The Schedule referred to in these Letters Patent and making part of the same.*

TO ALL WHOM IT MAY CONCERN:

Be it known that I, ALBERT J. GREENE, of Sterling, in the county of Worcester, and State of Massachusetts, have invented a new and improved Hand Hay-Rake; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
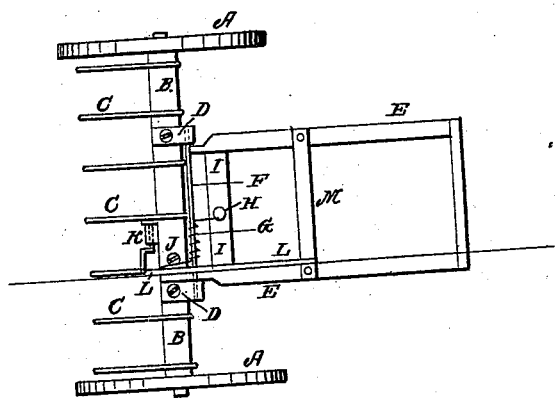
Figure 1 is a top view of my improved rake.
Figure 2:
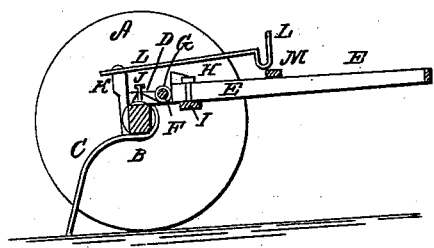
Figure 2 is a vertical section of the same, taken through the line $x\,x$, fig. 1.

My invention has for its object to furnish an improved hand-rake, simple in construction, easily operated, and which will do its work well; and it consists in the combination and arrangement of the various parts of the rake, as hereinafter more fully described.

A are the wheels, which I prefer to make about thirty inches in diameter, but the exact size of which is immaterial. B is the axle to which the spring-wire teeth C are secured, by being passed one or more times around it, and having their ends inserted in holes in the said axle. D are blocks or hinges, securely attached to the axle B and projecting in its front; through which, and through the ends of the shafts E, is passed a rod, F, securing the shafts to the axle in such a way that the forward ends of the shafts may be raised or lowered without affecting the axle, and that the axle may be partially revolved without affecting the shafts. The shafts E and axle B are kept in their proper relative positions by one or more springs, G, coiled around the rod F. One end of each of the springs G rests upon the upper side of the axle B, and the other ends of which rest upon thumb-screws H, screwed into the bar I, attached to the said shafts E. By turning the thumb-screw H up or down, the height at which the forward ends of the shafts E should be held to operate the rake, may be adjusted to the height of the person using it. The springs G may be kept in their proper relative positions by stop-pins J attached to the axle B, or by any other convenient means that will not affect their operation. To the rear side of the axle B is secured an arm, K, projecting upward, and to the upper end of which is pivoted the end of the rod L, which passes along one of the shafts E, and has a hook or bend formed in its forward end, which may be hooked upon the cross-bar M to hold the rake-teeth raised while drawing the rake from place to place.

In using the rake the teeth C are raised to discharge the collected hay by pulling upon the rod L, and at the same time slightly lowering the forward end of the shafts E, to partially relieve the spring or springs G.

Having thus described my invention, what I claim as new, and desire to secure by Letters Patent, is—

1. In a hand hay-rake, the arrangement of the axle B, teeth C, blocks or hinges D, rod F, and shaft E, with each other, substantially as herein shown and described.

2. The combination of the spring or springs G with the rod F, axle B, and shafts E, substantially as herein shown and described, and for the purpose set forth.

3. Adjusting the tension of the spring G by means of a thumb-screw, H, substantially as herein shown and described.

4. In a hand hay-rake, the arrangement of the arm K and rod L with the axle B and shafts E, substantially as herein shown and described, and for the purpose set forth.

ALBERT J. GREENE.

Witnesses:
WM. D. PECK,
JOSEPH GREENE.